US012674897B2

(12) United States Patent
Birkhold et al.

(10) Patent No.: US 12,674,897 B2
(45) Date of Patent: Jul. 7, 2026

(54) ESTIMATING A RADIATION LOAD QUANTITY FOR AN IMAGING SYSTEM HAVING A RADIATION SOURCE

(71) Applicant: Siemens Healthineers AG, Forchheim (DE)

(72) Inventors: Annette Birkhold, Stuttgart (DE); Philipp Roser, Erlangen (DE)

(73) Assignee: Siemens Healthineers AG, Forchheim (DE)

( * ) Notice: Subject to any disclaimer, the term of this patent is extended or adjusted under 35 U.S.C. 154(b) by 140 days.

(21) Appl. No.: 18/828,470

(22) Filed: Sep. 9, 2024

(65) Prior Publication Data

US 2025/0093531 A1 Mar. 20, 2025

(30) Foreign Application Priority Data

Sep. 18, 2023 (EP) ..................................... 23197942

(51) Int. Cl.
*G01T 1/02* (2006.01)
*G06N 20/00* (2019.01)

(52) U.S. Cl.
CPC .............. *G01T 1/02* (2013.01); *G06N 20/00* (2019.01)

(58) Field of Classification Search
CPC .... G01T 1/02; G01T 1/61; G01T 7/00; G06N 20/00; A61B 6/544; A61B 6/542; A61B 6/00; G06F 17/18
See application file for complete search history.

(56) References Cited

U.S. PATENT DOCUMENTS 6,422,751 B1 * 7/2002 Aufrichtig ............... H05G 1/28
378/207
10,753,969 B2 8/2020 Xu
(Continued)

FOREIGN PATENT DOCUMENTS

CN 106291650 A 1/2017
CN 104545957 B 8/2017
(Continued)

OTHER PUBLICATIONS

Poludniowski, Gavin, et al. "SpekPy v2. 0—a software toolkit for modeling x-ray tube spectra." Medical Physics 48.7 (2021): 3630-3637.
(Continued)

*Primary Examiner* — Courtney D Thomas
(74) *Attorney, Agent, or Firm* — Lempia Summerfield Katz LLC

(57) ABSTRACT

In order to estimate a radiation load quantity for an imaging system having a radiation source, a base model is obtained for determining the radiation load quantity depending on a set of input variables, which include at least one radiation-source operating parameter. Measurement data measured for the imaging system is obtained that includes the radiation load quantity for a multiplicity of different values of the at least one radiation-source operating parameter. A refined model is generated by adapting the base model depending on the measurement data. Actual values of the set of input variables are defined for the imaging system. The refined model is used to determine, depending on the actual values of the set of input variables, an estimated value of the radiation load quantity.

14 Claims, 3 Drawing Sheets

(56) References Cited

U.S. PATENT DOCUMENTS

| 2021/0121153 | A1 | 4/2021 | Ji |
| 2022/0192619 | A1 | 6/2022 | Sun |
| 2023/0389167 | A1 | 11/2023 | Goossen |

FOREIGN PATENT DOCUMENTS

| CN | 109060849 | B | 4/2021 |
| EP | 3992869 | A1 | 5/2022 |

OTHER PUBLICATIONS

Shetty, Karthik, et al. "BOSS: Bones, organs and skin shape model." Computers in Biology and Medicine 165 (2023): 107383. pp. 1-13.

Shetty, Karthik, et al. "Pliks: A pseudo-linear inverse kinematic solver for 3d human body estimation." Proceedings of the IEEE/CVF Conference on Computer Vision and Pattern Recognition. 2023. pp. 574-584.

* cited by examiner

ESTIMATING A RADIATION LOAD QUANTITY FOR AN IMAGING SYSTEM HAVING A RADIATION SOURCE

The present patent document claims the benefit of European Patent Application No. 23197942.8, filed Sep. 18, 2023, which is hereby incorporated by reference in its entirety.

TECHNICAL FIELD

The disclosure relates to a method for estimating a radiation load quantity for an imaging system having a radiation source, to a corresponding data processing apparatus, to an imaging system having a radiation source for generating ionizing radiation and having the data processing apparatus, and to a corresponding computer program product.

BACKGROUND

In the case of imaging systems having a radiation source for generating ionizing radiation, it is desirable, (e.g., for regulatory reasons), to document the radiation load for patients and medical personnel as exactly as possible. For this purpose, a relevant radiation load quantity may be measured during operation of the imaging system.

In X-ray based imaging systems, (e.g., X-ray based angiography systems), a dose area product (DAP) may be measured for this purpose as the radiation load quantity by a measuring apparatus called a DAP chamber in the beam path of the imaging system. In addition to being used for the regulatory requirements mentioned, the measured DAP may also be used for controlling the radiation source.

Such DAP chambers or equivalent measuring apparatuses for measuring the radiation load quantity cause increased scatter of the ionizing radiation because they are located in the beam path. This may not only increase the radiation load of the medical personnel in the surrounding area of the imaging system but also reduce the image quality as a result of additional off-focal radiation.

The publication G. Poludniowski et al., "Technical Note: SpekPy v2.0—a software toolkit for modeling x-ray tube spectra," Med. Phys. 48 (7), 3630 describes software for modeling X-ray tube spectra, and compares the predictions of the modeling with experimentally determined spectra.

Document CN 106291650 A describes a method based on Monte Carlo simulations for determining a radiation therapy dose. This is done by establishing a virtual source model, which is corrected on the basis of results from a water-model experiment. The corrected virtual source model is used to calculate the radiation dose in a tumor target area.

In addition, there are many known ways of adapting or generating from patient-specific information, (e.g., metadata such as body size, age, etc.), and/or image data, (e.g., pre-interventional CT-reconstructions, etc.), statistical patient models in such a way as to produce a patient-specific body model for the individual patient. Depending on the complexity, such body models may include skin, bone, vessels, and/or other internal organs.

The publication K. Shetty et al., "PLIKS: A Pseudo-Linear Inverse Kinematic Solver for 3D Human Body Estimation," (arXiv:2211.11734v2) describes a method for reconstructing a 3D mesh of the human body from a single 2D image. The method is based on a linearized formulation of the parametric SMPL model (skinned multi-person linear model). The publication K. Shetty et. al., "BOSS: Bones, Organs and Skin Shape Model," (arXiv:2303.04923v1) presents a deformable human shape and pose model that may combine skin, internal organs, and bones, learned from CT images. A holistic representation of the body is achieved by modeling the statistical variations in a position-normalized space using probabilistic principle component analysis while also preserving joint kinematics.

SUMMARY AND DESCRIPTION

An object of the present disclosure is to reduce the scattered radiation during operation of an imaging system having a radiation source.

The scope of the present disclosure is defined solely by the appended claims and is not affected to any degree by the statements within this summary. The present embodiments may obviate one or more of the drawbacks or limitations in the related art.

The disclosure is based on the idea of replacing a measuring apparatus for measuring a radiation load quantity in normal operation of the imaging system with a model-based estimation of the radiation load quantity. Proceeding from a base model for determining the radiation load quantity depending on a set of input variables, a refined model is generated from values of the radiation load quantity that are measured for the specific imaging system. The refined model is used to estimate the radiation load quantity in normal operation.

According to one aspect, a method is provided for estimating a radiation load quantity for an imaging system having a radiation source, in particular a radiation source for generating ionizing radiation. A base model is obtained for determining the radiation load quantity depending on a set of input variables. The set of input variables includes at least one radiation-source operating parameter. Measurement data measured for the imaging system is obtained. The measurement data includes the radiation load quantity for a multiplicity of different values of the at least one radiation-source operating parameter. A refined model, in particular a refined model for determining the radiation load quantity depending on the set of input variables, is generated by adapting the base model according to the measurement data. Actual values of the set of input variables are defined for the imaging system. The refined model is used to determine, depending on the actual values of the set of input variables, an estimated value of the radiation load quantity.

The actual process of carrying out the measurements for determining the measurement data is not necessarily part of the method. In the method, the measurement data may be obtained and may be stored on a data storage medium. The method may accordingly be in the form of a purely computer-implemented method. Unless stated otherwise, all the acts of the computer-implemented method may be performed by a data processing apparatus that has at least one computing unit. In particular, the at least one computing unit is configured or adapted to perform the computer-implemented method. For this purpose, the at least one computing unit may store, for example, one or more computer programs, the execution of which cause the at least one computing unit to execute the computer-implemented method.

In other embodiments of the method, this method includes determining the measurement data, e.g., measuring the radiation load quantity for the imaging system for the multiplicity of different values of the at least one radiation-source operating parameter. Accordingly, from each purely computer-implemented embodiment of the method arises directly a corresponding method for estimating a radiation load quantity, which method is, or is not, purely computer-implemented.

In both cases, the measurement data involves values of the radiation load quantity that are measured for the specific individual imaging system or the radiation source thereof. Consequently, the refined model may be regarded as a unit-specific model for the specific individual imaging system. This is not the case for the base model. The base model may model, for example, imaging systems of a specific sort or that have a specific sort of radiation source. It is also possible that the base model models a specific model type of the imaging system or a specific production series. For example, the base model may be created during a development phase, in particular for developing the imaging system. The refined model may be produced, for example, during, or at the end of, production of the specific imaging system.

The base model may receive as input data the relevant values of a set of the input variables and calculate the radiation load quantity on the basis thereof or depending thereon. The base model may thus be understood to be a function or mapping of the set of input variables onto the radiation load quantity. This applies analogously to the refined model.

The radiation load quantity is a measure of the amount of radiation to which an object or a person is exposed outside the radiation source, in particular at a defined position or in a defined area. The radiation load quantity relates in particular to a dose or energy of the ionizing radiation in a defined measurement area outside the radiation source. For example, the radiation load quantity may correspond to an energy per unit area and/or per unit mass, etc. The radiation load quantity may correspond to a kerma or a dose area product, DAP, for example.

In order to produce the measurement data, the values of the at least one radiation-source operating parameter are varied, and the radiation load quantity is measured, respectively. In addition to varying the at least one radiation-source operating parameter, other parameters, or variables of the set of input variables may be varied, in particular all the variables of the set of input variables, in order to measure the radiation load quantity accordingly for each.

The at least one radiation-source operating parameter corresponds in particular to at least one parameter that is adjusted for the radiation source or is given for the radiation source in order to generate the ionizing radiation.

If, for example, the radiation source is an X-ray radiation source, so in particular an X-ray tube, then the at least one radiation-source operating parameter may include in particular a peak kilovoltage (kVp), e.g., a maximum tube voltage that is applied to the X-ray tube during generation of the X-ray radiation as ionizing radiation. The at least one radiation-source operating parameter may also include a tube current of the X-ray tube and/or a focal spot size, etc.

The generating of the refined model by adapting the base model depending on the measurement data may be understood also to mean, for example, that the refined model is generated on the basis of the measurement data taking into account the base model, in particular taking into account the base model as the starting point or initial state. The base model may be defined, for example, by a multiplicity of model parameters, and adapting the base model depending on the measurement data may be performed by adapting the model parameters in such a way that the refined model may reproduce the measurement data correctly, or in such a way as to reduce the error in the reproduction of the measurement data compared with the base model. The model parameters may also be weighting factors or bias factors of a neural network if the base model contains such a neural network. It is not necessary for the base model to be based on a neural network or another machine-trainable algorithm. Thus the model parameters may also be polynomial coefficients of a polynomial model or other curve parameters of the aforementioned function or mapping.

By using the refined model, it is possible in normal operation, (e.g., during scientific or clinical operation), of the imaging system to dispense with hardware such as a DAP chamber, for example, in the beam path for determining the radiation load quantity. The amount of controlled ionizing radiation is thereby reduced.

As mentioned in the introduction, the radiation load quantity may be used for documenting the radiation load of patients or medical personnel. It is also possible to use the radiation load quantity, for example, for controlling the radiation source or for other purposes.

Since the refined model is generated on the basis of the measurement data for the specific imaging system, the estimate of the radiation load quantity may be increased in particular even compared with an estimate based on an ideal radiation source or on an idealized imaging system based solely on physical models. In comparison with highly accurate physical simulations for calculating the radiation load quantity, (e.g., using Monte Carlo methods), the method may save a considerable amount of computing resources, in particular computing time.

According to at least one embodiment, after an update period has elapsed after a measurement of the measurement data, further measurement data measured for the imaging system is obtained, (e.g., measured). The further measurement data contains the radiation load quantity for a further multiplicity of different values of the at least one radiation-source operating parameter. An updated model is generated by adapting the refined model depending on the further measurement data. Further values of the set of input variables for the imaging system are defined, and the updated model is used to determine, depending on the further values of the set of input variables, a further estimated value for the radiation load quantity.

If and when the update period has elapsed may be decided on the basis of preset time intervals and/or on the basis of monitoring measurements at the imaging system.

The explanations relating to the measurement data may be applied analogously to the further measurement data. The updated model may be generated on the basis of the refined model in an analogous manner to how the refined model was generated previously on the basis of the base model. Associated explanations may be applied analogously.

The radiation load quantity depends on the values of the set of input variables and in particular on the values of the at least one radiation-source operating parameter. This dependency may change as a result of aging effects, in particular on the radiation source, (e.g., the anode in the case of an X-ray tube), and/or other components of the imaging system, (e.g., for filtering the ionizing radiation and/or beam-forming, etc.). Therefore, the generating of the updated model in corresponding embodiments of the method may at least partially correct deviations and inaccuracies in the refined model that may appear over time as a result of the aging effects mentioned.

According to at least one embodiment, measured reference measurement data is obtained for at least one reference imaging system. The reference measurement data includes the radiation load quantity for a multiplicity of different values of the at least one radiation-source operating parameter. The base model is generated on the basis of the reference measurement data.

The explanations relating to the measurement data may be applied analogously to the reference measurement data, where the reference measurement data may originate from measurements for a plurality of reference imaging systems, and/or may be captured repeatedly at different times, for example, in order to take into account aging effects and/or the influence of temperature.

The reference imaging systems may be the same type or model as the imaging system, or a similar or comparable model. For example, the sort of radiation source, (e.g., an X-ray source), may be the same for the reference imaging system and the imaging system. The individual reference imaging systems do not necessarily have to be identical to the imaging system. The base model is thus a more generic model than the refined model, which is adapted specifically for the individual imaging system. Therefore the base model may be used for different imaging systems in order to generate relevant different unit-specific refined models, as described above.

According to at least one embodiment, a physical initial model is obtained for determining the radiation load quantity depending on the set of input variables. The base model is generated by adapting the physical initial model depending on the reference measurement data.

The physical initial model may be a model generated on the basis of physical relationships, in particular physical relationships in the generation of the ionizing radiation by the radiation source. The physical initial model may also include approximations. In particular, the physical initial model is not an algorithm that is entirely or largely trained by machine learning.

For example, the physical initial model may be defined or specified by a set of model parameters. The base model is then generated in particular by adapting the set of model parameters according to the reference measurement data. In an analogous manner, the refined model may be generated by readapting the set of model parameters in accordance with the measurement data.

According to at least one embodiment, the base model is generated by using the reference measurement data as the basis for training an algorithm trainable by machine learning. In particular, the base model is the algorithm trained by the machine learning.

For example, the trainable algorithm may contain one or more artificial neural networks and/or one or more support vector machines (SVM).

The training of the trainable algorithm on the basis of the reference measurement data may be performed according to a known training method, for example, for neural networks or SVMs.

In such embodiments, the refined model may also be generated by retraining or training further on the basis of the measurement data the algorithm trained on the basis of the reference measurement data. It is also possible that the base model is given by the trained algorithm, but the refined model is generated on the basis of physical models, or vice versa.

Because trainable algorithms, in particular artificial neural networks, may be regarded as universal approximations of functions, the base model in such embodiments may be generated with high accuracy regardless of whether or not the physical relationships for generating the ionizing radiation, and in particular the influence of aging effects or the like, are known.

According to at least one embodiment, the set of input variables includes at least one state parameter and/or material parameter for a radiation filtering apparatus of the imaging system. The measurement data includes the radiation load quantity for a multiplicity of different values of the at least one state and/or material parameter.

In various embodiments, this applies analogously to the reference measurement data and/or the further measurement data.

The radiation filtering apparatus may involve one or more filters for inserting in the beam path, in particular between a region from which the ionizing radiation exits the radiation source and an object to be examined or imaged. In the case of an X-ray based imaging system and an X-ray tube as the radiation source, the at least one filter may include one or more homogeneous metal filters for beam hardening, e.g., for filtering out low-energy components, and/or one or more wedge filters, etc.

The at least one state parameter and/or material parameter for the radiation filtering apparatus may involve a filter-layer thickness, a material of the filter concerned, a position of the filter, in particular in the case of a wedge filter, etc.

Hence, the refined model may also accurately take into account aging effects of the radiation filtering apparatus, for instance caused by material changes in the filter material as a result of X-ray radiation and so on.

According to at least one embodiment, the set of input variables includes at least one state parameter and/or material parameter for a beam-forming apparatus of the imaging system. The measurement data includes the radiation load quantity for a multiplicity of different values of the at least one state and/or material parameter.

In various embodiments, this applies analogously to the reference measurement data and/or the further measurement data.

The beam-forming apparatus may involve one or more collimators for inserting in the beam path, in particular between the radiation filtering apparatus and the object.

The at least one state parameter and/or material parameter for the beam-forming apparatus may involve a thickness or geometry of a collimator, a material of the collimator concerned, an aperture size of the collimator, etc.

Hence, the refined model may also accurately take into account aging effects of the beam-forming apparatus, for instance caused by material changes in the collimator as a result of X-ray radiation and so on.

According to at least one embodiment, the set of input variables includes an ambient temperature of the radiation source, and the measurement data includes the radiation load quantity for a multiplicity of different values of the ambient temperature.

Temperature-dependent effects, which may influence the radiation load quantity, may be taken into account in this manner. The ambient temperature may correspond to an air temperature of a room in which the radiation source is located, or to an air temperature in an enclosure in which the radiation source is located.

According to at least one embodiment, the set of input variables includes a temperature of at least one component, in particular of the imaging system, located in the environment of the radiation source, for example, and the measurement data includes the radiation load quantity for a multiplicity of different values of the temperature of the at least one component.

Temperature-dependent effects, which may influence the radiation load quantity, may be taken into account in this manner. In particular, the at least one component may influence the value of the radiation load quantity as a result of heat dissipation.

According to at least one embodiment, the set of input variables includes at least one exposure parameter, and the measurement data includes the radiation load quantity for a multiplicity of different values of the at least one exposure parameter.

If applicable, this applies analogously to the reference measurement data and/or the further measurement data.

The exposure parameters are referred to here and below as such, although in the context of ionizing radiation, this need not relate to light in the actual sense but may instead also relate to X-ray radiation, for example. The understanding of the term "exposure" may also be applied analogously to other electromagnetic radiation, e.g., X-ray radiation. The at least one exposure parameter may include an exposure duration or a collimator aperture during the exposure, or a pulse width of a pulse of the ionizing radiation during the exposure, etc.

The refined model may be generated accurately in this manner for different settings for the exposure.

According to at least one embodiment, the radiation load quantity is a dose area product or a kerma or a variable that depends on the dose area product and/or the kerma.

The radiation source in this case is an X-ray tube by way of example. There are also analogous variables for other ionizing radiation types.

According to at least one embodiment, image data generated by the imaging system and that represents an object to be imaged, (e.g., a body of a patient), is obtained. In addition, a body model for the object, (e.g., for the body of the patient), is obtained. A consistency check is carried out on the basis of the image data, on the basis of the body model, on the basis of values of the set of input variables, which values were used to generate the image data, and on the basis of the refined model. Depending on the result of the consistency check, it is ascertained whether the update period has elapsed.

In particular, a consistency measure is thus defined depending on the result of the consistency check, and it is decided on the basis of the consistency measure whether or not the update period has elapsed.

Thus in such embodiments, the update period is not a fixed time interval but is defined depending on the specific properties of the imaging system at the current time, in particular depending on the image data.

The consistency check may include a check for whether the image data, the body model, the values of the set of input variables, which values were used to generate the image data, and the refined model are mutually consistent.

If it is ascertained, for example, that these are consistent, and hence ascertained that the update period has not elapsed, the refined model may continue to be retained. On the other hand, if it is ascertained that there is no consistency, or not enough consistency, e.g., the update period has consequently elapsed, the updated model may be generated on the basis of the refined model, as described above.

Obtaining the body model may be understood in the sense that it is provided in a computer-readable form, in particular is stored. The method may also include generating the body model, or part of the body model, for instance by adapting a predefined statistical body model.

For example, the body model corresponds to a three-dimensional spatially resolved distribution of an attenuation coefficient for the ionizing radiation in question, which distribution is given in the form of a voxel model, for example.

The consistency check may be carried out in various ways. According to at least one embodiment, simulated image data is generated on the basis of the body model, on the basis of the values of the set of input variables, which values were used to generate the image data, and on the basis of the refined model, and the simulated image data is compared with the image data for the purpose of the consistency check.

Thus, the result of the consistency check includes, in particular, a divergence of the image data from the simulated image data. If the divergence is greater than a preset limit value, then it may be decided that the update period has elapsed.

According to at least one embodiment, a comparative model is generated on the basis of the image data, on the basis of the body model, and on the basis of the values of the set of input variables, which values were used to generate the image data, and the comparative model is compared with the refined model for the purpose of the consistency check.

Thus the result of the consistency check includes in particular a divergence of the comparative model from the refined model, for instance a divergence of the corresponding model parameters. If this divergence is greater than a preset limit value, then it may be decided that the update period has elapsed.

According to at least one embodiment, a comparative body model is generated on the basis of the image data, on the basis of the values of the set of input variables, which values were used to generate the image data, and on the basis of the refined model, and the comparative body model is compared with the body model for the purpose of the consistency check.

Thus the result of the consistency check includes, in particular, a divergence of the comparative body model from the body model. If this divergence is greater than a preset limit value, then it may be decided that the update period has elapsed.

According to at least one embodiment, the consistency check includes applying a further algorithm, which is trained by machine learning, to input data that depends on the image data, the body model, the values of the set of input variables, which values were used to generate the image data, and the refined model.

An output of the further trained algorithm then corresponds to the result of the consistency check, e.g., a measure of the consistency of the input data.

According to at least one embodiment, the imaging system is an X-ray based imaging system, and the radiation source is an X-ray radiation source, (e.g., an X-ray tube).

According to a further aspect, a data processing apparatus is specified. The data processing apparatus has at least one computing unit, which is configured to perform a method, in particular a computer-implemented method.

A computing unit may be understood to mean in particular a data processing unit that contains a processing circuit. In particular, the computing unit may thus process data for performing computing operations. These also include operations for performing indexed accesses to a data structure, for instance to a look-up table (LUT).

The computing unit may contain in particular one or more computers, one or more microcontrollers, and/or one or more integrated circuits, for example, one or more application-specific integrated circuits (ASIC), one or more field-programmable gate arrays (FPGA), and/or one or more systems on a chip (SoC). The computing unit may also contain one or more processors, for example, one or more microprocessors, one or more central processing units (CPU), one or more graphics processing units (GPU), and/or one or more signal processors, in particular one or more digital signal processors (DSP). The computing unit may also contain a physical or virtual interconnection of computers or other of the aforementioned units.

In various embodiments, the computing unit contains one or more hardware and/or software interfaces and/or one or more memory units.

A memory unit may be embodied as a volatile data storage medium, for example, as a dynamic random access memory (DRAM) or a static random access memory (SRAM), or as a non-volatile data storage medium, for example, as a read-only memory (ROM), as a programmable read-only memory (PROM), as an erasable programmable read-only memory (EPROM), as an electrically erasable programmable read-only memory (EEPROM), as a flash memory or flash EEPROM, as a ferroelectric random access memory (FRAM), as a magneto-resistive random access memory (MRAM), or as a phase-change random access memory (PCRAM).

According to a further aspect, an imaging system is specified. The imaging system has a data processing apparatus, a radiation source for generating ionizing radiation, and a radiation detector for detecting portions of the ionizing radiation, in particular portions of the ionizing radiation that have passed through the object to be imaged.

Further embodiments of the imaging system follow directly from the various embodiments of the method, and vice versa. In particular, individual features and associated explanations and advantages relating to the various embodiments for the method may be applied analogously to corresponding embodiments of the imaging system.

According to a further aspect, a computer program containing commands is specified. When the commands are executed by at least one data processing apparatus, in particular by a data processing apparatus, the commands cause the data processing apparatus to perform a method.

For example, the commands may exist as program code. The program code may be provided, for example, as binary code or assembler and/or as source code of a programming language, for instance C, and/or as program script, for instance Python.

According to a further aspect, a computer-readable storage medium is defined, which stores a computer program.

The computer program and the computer-readable storage medium are each computer program products containing the commands.

Further features and combinations of features appear in the figures and description of the figures and in the claims. In particular, further embodiments need not necessarily contain all the features of one of the claims. Further embodiments may have features or combinations of features that are not mentioned in the claims.

BRIEF DESCRIPTION OF THE DRAWINGS

The disclosure is described in greater detail below with reference to specific embodiments and associated schematic drawings. In the figures, identical or functionally equivalent elements may be denoted by the same reference signs. The description of identical or functionally equivalent elements is not necessarily repeated when referring to different figures.

DETAILED DESCRIPTION

Figure 1:
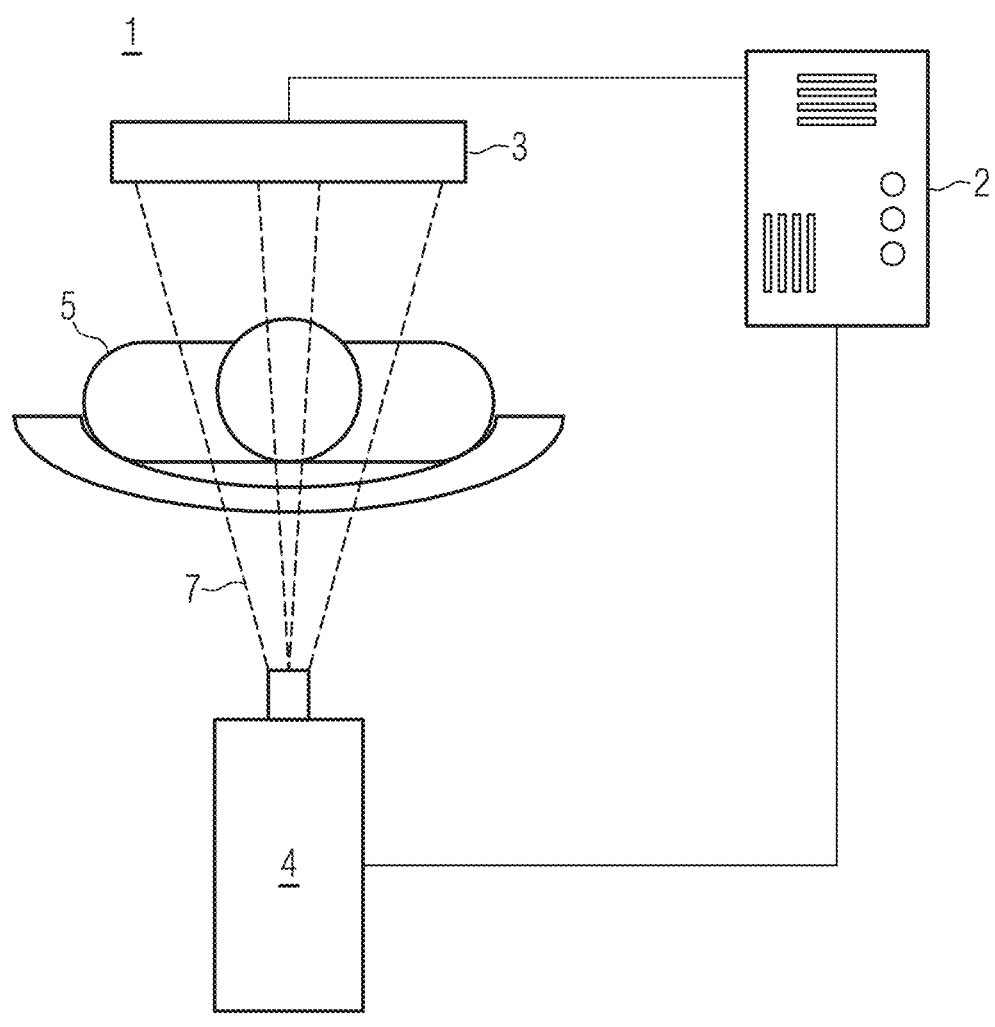
FIG. 1 depicts a schematic representation of an embodiment of an imaging system.

FIG. 1 shows schematically an exemplary embodiment of an imaging system 1. The imaging system 1 has at least one computing unit 2, and an imaging modality, which has a radiation source 4 for generating ionizing radiation 7, and a radiation detector 3 for detecting portions of the ionizing radiation 7. For example, the imaging modality is an X-ray based imaging modality, for instance an X-ray based angiography system, and has an X-ray source as the radiation source 4 and an X-ray detector as the radiation detector 3. The figure also shows a patient 5 as the object to be imaged.

Figure 2:
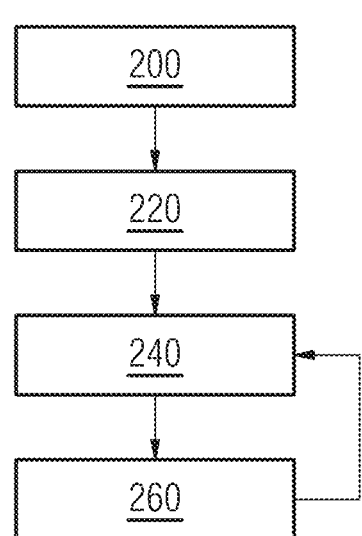
FIG. 2 depicts a schematic flow diagram of an embodiment of a method for estimating a radiation load quantity.

The at least one computing unit 2 is configured to perform a method for estimating a radiation load quantity, (e.g., a kerma or a DAP), for the imaging system 1. FIG. 2 shows a schematic flow diagram of an embodiment of such a method, in which act 260 is optional.

The kerma, in particular the air kerma, is the energy released per unit mass, in particular in air, and is measured in Gy. It may be defined as the product of the energy, the photon fluence rate, and the energy absorption of the radiation 7 in air. In homogeneous media such as air, the kerma is approximately equal to the dose. The DAP, measured in $Gym^2$, is defined as the kerma multiplied by the relevant area exposed to the radiation. In addition to depending on the medium with which the radiation 7 is interacting, so in particular air, the kerma and DAP depend on the energy spectrum of the radiation. Both variables provide the same information. If the kerma or the DAP is known, each variable may be derived from the other.

Figure 4:
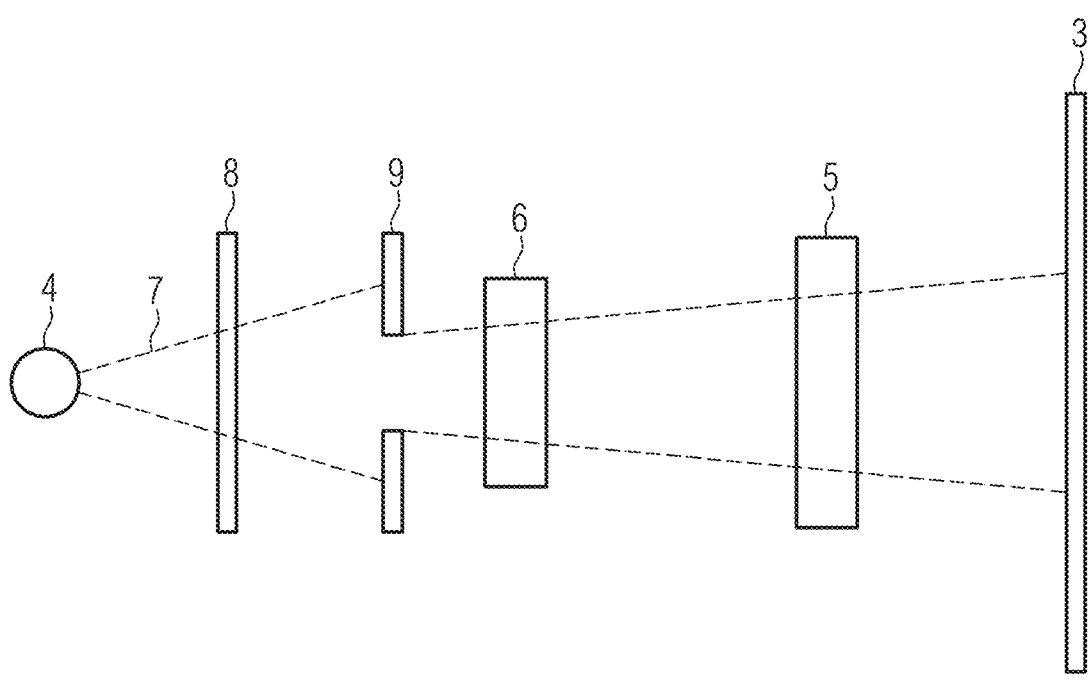
FIG. 4 depicts a schematic representation of the measurement of a radiation load quantity according to a further embodiment of a method for estimating a radiation load quantity.

FIG. 4 shows schematically the beam path from the radiation source 4 to the radiation detector 3 for a further embodiment of the imaging system 1. In this case, directly after the radiation source 4 are arranged, for example, a radiation filtering apparatus 8, for instance in the case of an X-ray tube a filter for beam hardening and/or a wedge filter, and/or a beam-forming apparatus 9, for instance a collimator. Between the patient 5 on one side and the radiation source 4, the radiation filtering apparatus 8 and the beam-forming apparatus 9 on the other side may be inserted a measuring apparatus 6, (e.g., a DAP chamber), for measuring the radiation load quantity.

In act 200, a base model is obtained for determining the radiation load quantity depending on a set of input variables, which input variables include at least one radiation-source operating parameter.

In act 220, measurement data measured for the imaging system 1, in particular measurement data measured by the measuring apparatus 6, is obtained that includes the radiation load quantity for a multiplicity of different values of the at least one radiation-source operating parameter. A refined model is generated by adapting the base model depending on the measurement data.

In act 240, actual values of the set of input variables for the imaging system 1 are defined, and the refined model is used to determine, depending on the actual values of the set of input variables, an estimated value for the radiation load quantity.

In the optional act 260, in some embodiments, further measurement data measured for the imaging system 1 is obtained that includes the radiation load quantity for a further multiplicity of different values of the at least one radiation-source operating parameter. An updated model is generated by adapting the refined model depending on the further measurement data. Further values of the set of input variables for the imaging system 1 are defined, and the updated model is used to determine, depending on the further values of the set of input variables, a further estimated value for the radiation load quantity.

Since the radiation load quantity, in particular the DAP or the kerma, depends on the energy spectrum of the radiation 7. In principle, it may be estimated using information relating to the radiation source 4, in particular to the radiation-source operating parameters such as, in the case of an X-ray tube, peak kilovoltage, tube current, focal spot size, etc., and, if applicable, information relating to the radiation filtering apparatus 8, such as filter material thickness, wedge-filter position, etc., or relating to the beam-forming apparatus 9, for instance an extent of the collimated field, and using information relating to the exposure, such as exposure duration, pulse width, etc., because this information may be available for every acquisition. The energy spectrum of the radiation source 4 may vary over time, for instance as a result of aging effects, as may the properties of the radiation filtering apparatus 8 and the beam-forming apparatus 9. The refined model implicitly takes into account such changes, thereby improving the accuracy of the refined model compared with the base model.

The base model itself may be provided in various ways. For example, reference measurement data measured for at least one reference imaging system may be obtained, for instance during a development phase, which reference measurement data includes the radiation load quantity for a multiplicity of different values of the at least one radiation-source operating parameter, and the base model may be generated on the basis of the reference measurement data. The reference measurement data may be extremely comprehensive. For example, a physical initial model for determining the radiation load quantity depending on the set of input variables may be adapted on the basis of the reference measurement data in order to generate the base model. The base model may also be generated by using the reference measurement data as the basis for training an algorithm trainable by machine learning. The base model may also be recreated from time to time in order to take account of changes in the system.

The measurement data for generating the refined model may then be captured, for example, during production of the specific imaging system 1, in particular the radiation source 4, where the measurement data may be less comprehensive than the reference measurement data.

For example, the base model may be a physical model, which calculates an ideal energy spectrum and derives the radiation load quantity therefrom. The base model may also be an approximation of such a physical model, for instance obtained by a polynomial or spline approximation. The base model may also be a model trained on the basis of machine learning.

The refined model may be a model trained on the basis of machine learning for estimating the effective parameters for aged components of the imaging system 1. For example, in the refined model, these effective parameters may be altered compared with the base model. For instance, in the case of an X-ray imaging system, an aged metal filter made of a first material, (e.g., copper), may be approximated by an effective metal filter made of another material and/or of a different material thickness. The refined model may also be implemented by it containing the base model, and by correcting the output from the base model, for instance by multiplying by scalar correction factors.

Figure 3:
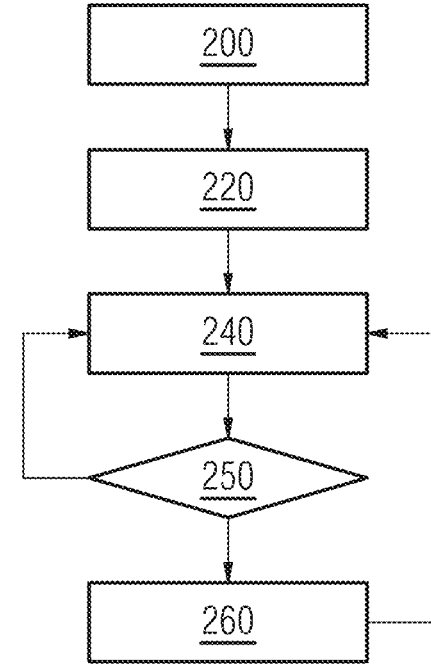
FIG. 3 depicts a schematic flow diagram of a further embodiment of a method for estimating a radiation load quantity.

FIG. 3 shows a schematic flow diagram of a further exemplary embodiment of a method, where the acts 200, 220, 240, and 260 correspond to those of the method in FIG. 2.

In the method shown in FIG. 3, a consistency check is carried out after act 240 and before act 260. Act 260 is only carried out if or when it is ascertained from a result of the consistency check that an inconsistency exists, otherwise the refined model continues to be used.

In order to carry out the consistency check, image data generated by the imaging system 1 and that represents a patient 5 is obtained, and a body model for the body of the patient 5 is obtained. The consistency check is carried out as a cross-validation of the image data, the body model, the values for the set of input variables, which values were used to generate the image data, and the refined model.

For example, simulated image data may be generated on the basis of the body model, on the basis of the values of the set of input variables, which values were used to generate the image data, and on the basis of the refined model, and the simulated image data may be compared with the image data for the purpose of the consistency check. For example, rendering methods and/or physical simulations may be used for generating the simulated image data. If the simulated image data diverges too greatly from the image data according to preset limits, then the existence of an inconsistency may be inferred, and hence the refined model may be updated.

Alternatively, or additionally, a comparative model may be generated on the basis of the image data, on the basis of the body model, and on the basis of the values of the set of input variables, which values were used to generate the image data, and the comparative model may be compared with the refined model for the purpose of the consistency check. For example, the comparative model may be determined by inverse rendering methods and/or physical simulations. If the comparative model diverges too greatly from the refined model according to preset limits, then the existence of an inconsistency may be inferred, and hence the refined model may be updated.

Furthermore, alternatively, or additionally, a comparative body model may be generated on the basis of the image data, on the basis of the values of the set of input variables, which values were used to generate the image data, and on the basis of the refined model, and the comparative body model may be compared with the body model for the purpose of the consistency check. For example, the comparative body model may be determined by inverse rendering methods and/or physical simulations. If the comparative body model diverges too greatly from the body model according to preset limits, then the existence of an inconsistency may be inferred, and hence the refined model may be updated.

The consistency check may be used to reveal discrepancies or divergences between the particular prediction and actual input data. By way of inverse rendering, also known as differentiable rendering, and/or physical simulations, the consistency check may also be performed as a solution to an optimization problem. It is also possible to carry out the particular comparison of the data by a suitably trained algorithm, which, for example, receives the image data and the simulated data as the input data, and predicts a consistency value as the output. In an analogous manner, the comparative model and the refined model, or the comparative body model and the body model, may be used as the input data.

By carrying out the cross-validation, it is also possible to identify the confounding factors in the entire method chain, in order to provide that the correct action is proposed. If, for example, the body model is the main reason for an inconsistency, it may be the case that it is not necessary to update the refined model.

As an alternative to the described cross-validation, an algorithm suitably trained by machine learning may be used to predict the necessity of updating the refined model. One implementation might be an algorithm that uses as the inputs parameters for defining the refined model, parameters for defining the body model, parameters for defining the system geometry, and the values used to generate the image data, and that predicts a consistency value as the output.

The facility to determine flexibly and according to the actual circumstances whether the refined model needs updating may save unnecessary measures and hence save time and money. In addition, the need for an update may be identified quickly, and an appropriate response may be made.

Independent of the grammatical term usage, individuals with male, female or other gender identities are included within the term. This applies in particular to the term "patient."

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for estimating a radiation load quantity for an imaging system having a radiation source, the method comprising:

obtaining a base model for determining the radiation load quantity depending on a set of input variables that comprise at least one radiation-source operating parameter;

obtaining measurement data measured for the imaging system, wherein the measurement data comprises the radiation load quantity for a multiplicity of different values of the at least one radiation-source operating parameter;

generating a refined model by adapting the base model depending on the measurement data;

defining actual values of the set of input variables for the imaging system; and

determining, using the refined model, an estimated value of the radiation load quantity depending on the actual values of the set of input variables.

2. The method of claim 1, further comprising:

obtaining reference measurement data measured for at least one reference imaging system, wherein the reference measurement data comprises the radiation load quantity for a multiplicity of different values of the at least one radiation-source operating parameter; and generating the base model based on the reference measurement data.

3. The method of claim 2, further comprising:

obtaining a physical initial model for determining the radiation load quantity depending on the set of input variables, wherein the base model is generated by adapting the physical initial model depending on the reference measurement data.

4. The method of claim 2, wherein the base model is generated by using the reference measurement data as a basis for training an algorithm trainable by machine learning.

5. The method of claim 1, wherein the set of input variables comprises at least one state parameter and/or at least one material parameter for a radiation filtering apparatus and/or a beam-forming apparatus, and wherein the measurement data comprises the radiation load quantity for a multiplicity of different values of the at least one state parameter and/or the at least one material parameter.

6. The method of claim 1, wherein the set of input variables comprises at least one exposure parameter, and wherein the measurement data comprises the radiation load quantity for a multiplicity of different values of the at least one exposure parameter.

7. The method of claim 1, wherein the radiation load quantity is a dose area product, a kerma, or a variable that depends on the dose area product and/or the kerma.

8. The method of claim 1, wherein, after an update period has elapsed after a measurement of the measurement data, the method further comprises:

obtaining further measurement data measured for the imaging system that comprises the radiation load quantity for a further multiplicity of different values of the at least one radiation-source operating parameter;

generating an updated model by adapting the refined model depending on the further measurement data;

defining further values of the set of input variables for the imaging system; and determining, using the updated model, a further estimated value of the radiation load quantity depending on the further values of the set of input variables.

9. The method of claim 8, further comprising:

obtaining image data generated by the imaging system, wherein the image data represents an object;

obtaining a body model for the object;

carrying out a consistency check based on the image data, the body model, values of the set of input variables, and the refined model, wherein the values were used to generate the image data; and ascertaining, depending on a result of the consistency check, whether the update period has elapsed.

10. The method of claim 9, further comprising:

generating simulated image data based on the body model, the values of the set of input variables, and the refined model, and comparing the simulated image data with the image data for a purpose of the consistency check; and/or generating a comparative model based on the image data, the body model, and the values of the set of input variables, and comparing the comparative model with the refined model for the purpose of the consistency check; and/or generating a comparative body model based on the image data, the values of the set of input variables, and the refined model, and comparing the comparative body model with the body model for the purpose of the consistency check.

11. The method of claim 9, wherein the consistency check comprises applying a further algorithm, trained by machine learning, to input data that depends on the image data, the body model, the values of the set of input variables, and the refined model.

12. The method of claim 1, wherein the imaging system is an X-ray based imaging system, and wherein the radiation source is an X-ray radiation source.

13. A data processing apparatus comprising:

at least one computing unit configured to:

obtain a base model for determining a radiation load quantity depending on a set of input variables that comprise at least one radiation-source operating parameter;

obtain measurement data measured for an imaging system, wherein the measurement data comprises the radiation load quantity for a multiplicity of different values of the at least one radiation-source operating parameter;

generate a refined model by adapting the base model depending on the measurement data;

define actual values of the set of input variables for the imaging system; and determine, using the refined model, an estimated value of the radiation load quantity depending on the actual values of the set of input variables.

14. An imaging system comprising:

a radiation source for generating ionizing radiation;

a radiation detector for detecting portions of the ionizing radiation; and a data processing apparatus having at least one computing unit configured to:

obtain a base model for determining a radiation load quantity depending on a set of input variables that comprise at least one radiation-source operating parameter;

obtain measurement data measured for the imaging system, wherein the measurement data comprises the radiation load quantity for a multiplicity of different values of the at least one radiation-source operating parameter;

generate a refined model by adapting the base model depending on the measurement data;

define actual values of the set of input variables for the imaging system; and determine, using the refined model, an estimated value of the radiation load quantity depending on the actual values of the set of input variables.

* * * * *